US006708106B2

(12) United States Patent
Wakao et al.

(10) Patent No.: US 6,708,106 B2
(45) Date of Patent: Mar. 16, 2004

(54) THROTTLE VALVE OPENED AMOUNT CALCULATOR

(75) Inventors: Hisaaki Wakao, Kariya (JP); Yutaka Mori, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/284,147

(22) Filed: Oct. 31, 2002

(65) Prior Publication Data

US 2003/0083800 A1 May 1, 2003

(30) Foreign Application Priority Data

Oct. 31, 2001 (JP) ....................................... 2001-333714

(51) Int. Cl.[7] .......................... F02D 45/00; G01D 18/00

(52) U.S. Cl. ...................... 701/114; 701/115; 73/118.1; 702/87

(58) Field of Search ................................ 701/114, 115, 701/102; 73/118.1, 1.88, 1.75; 702/87

(56) References Cited

U.S. PATENT DOCUMENTS 4,515,009 A * 5/1985 Hasegawa et al. ......... 73/118.1
4,951,206 A * 8/1990 Kyohzuka .................. 73/118.1
5,578,749 A * 11/1996 Mogaki ..................... 73/118.1

* cited by examiner

*Primary Examiner*—Andrew M. Dolinar
(74) *Attorney, Agent, or Firm*—Oblon, Spivak, McClelland, Maier & Neustadt, P.C.

(57) ABSTRACT

A calculator for calculating an opened amount of a throttle valve with high accuracy regardless of voltage fluctuation and noise. The calculator includes a valve sensor for detecting the opened amount of the throttle valve to generate a detection voltage. A memory stores an initial zero point detection value. A calculation circuit obtains the difference between the detection voltage and the initial zero point detection value and calculates the opened amount of the throttle valve with the difference. When a plurality of detection voltages that are less than the initial zero point detection value are generated, the calculation circuit calculates a new zero point detection value that is greater than a smallest one of the plurality of detection voltages by a predetermined value and updates the initial zero point detection value with the new zero point detection value.

26 Claims, 3 Drawing Sheets

THROTTLE VALVE OPENED AMOUNT CALCULATOR

BACKGROUND OF THE INVENTION

The present invention relates to a throttle valve opened amount calculator.

Automobiles are provided with throttle valve sensors. A throttle valve opened amount sensor detects the opened amount of a throttle valve, which is arranged in an intake passage and opened and closed in accordance with the depressed amount of an acceleration pedal. The opened amount of the throttle valve is used as a parameter to perform engine control, such as fuel injection and ignition adjustment. In a four wheel drive vehicle, the throttle valve opened amount is used as a parameter for controlling distribution of the drive force of a transmission installed in the vehicle.

The throttle valve opened amount θ is calculated as described below.

A CPU receives a detection signal (detection voltage TPV) from a throttle valve sensor and uses the detection voltage TPV and predetermined data to obtain the throttle valve opened amount θ. More specifically, the CPU subtracts a predetermined reference value (zero point detection value TPV0) from the detection voltage TPV to obtain an absolute value (TPA=TPV-TPV0).

The CPU uses map data of the throttle valve opened amount θ corresponding to the absolute value TPA to obtain the throttle valve opened amount θ corresponding to the present detection voltage (absolute value TPA). The zero point detection value TPV0 is the voltage value output from the throttle valve sensor when the throttle valve is fully closed (θ=0).

The throttle valve opened amount θ is obtained from the absolute value TPA for the following reason. There are differences between throttle valve sensors, which are installed in automobiles. Thus, the zero point detection value TPV0 differs between sensors (e.g., 0.6±0.2V). Accordingly, the zero point detection value TPV0 is obtained for each throttle valve sensor and the absolute value TPA is obtained from the zero point detection value TPV0. By obtaining the zero point detection value TPV0 in accordance with the absolute value TPA, errors that result from differences between sensors are prevented and the throttle valve opened amount θ is accurately obtained. In this state, the same map data for obtaining the throttle valve opened amount θ is used for every automobile even though there may be differences between throttle valve sensors.

Changes in the sensor caused by reasons such as wear occur as time passes by. Thus, the CPU periodically corrects the zero point detection value TPV0. When the detection value TPV is smaller than the zero point detection value TPV0, the CPU sets the detection voltage TPV as a new zero point detection value TPV. The CPU obtains the throttle valve opened amount θ in accordance with the updated zero point detection value TPV0. Accordingly, the zero point detection value TPV0 is replaced by a smaller value whenever the detection voltage TPV is less than the zero point detection value TPV0.

In the prior art process for correcting the zero point detection value TPV0, when the detection voltage TPV is less than the present zero point detection value TPV0, the zero point detection value TPV0 is immediately updated with the detection voltage TPV. Thus, when the power supply voltage supplied to the sensor decreases for one reason or another or when the detection voltage TPV momentarily decreases due to noise, there is a possibility that the CPU may set the detection voltage TPV as the new zero point detection value TPV0.

The drive force transmission of a four wheel drive vehicle is normally separated from the throttle valve sensor, which is controlled by an engine controller. Thus, the signal line of the sensor is long and is apt to being affected by noise. Consequently, the zero point detection value TPV0 may be updated when not necessary.

SUMMARY OF THE INVENTION

It is an object of the present invention to provide a throttle valve opened amount calculator that accurately calculates the throttle valve opened amount regardless of voltage fluctuation or noise.

To achieve the above object, the present invention provides a throttle valve opened amount calculator. The calculator includes a valve sensor for detecting an opened amount of a throttle valve to generate a detection voltage. A memory is connected to the valve sensor to store an initial zero point detection value. The initial zero point detection value is the detection voltage output from the throttle valve sensor when the throttle valve is fully closed. A calculation circuit is connected to the valve sensor and the memory to obtain the difference between the detection voltage and the initial zero point detection value and to calculate the opened amount of the throttle valve with the difference. When a plurality of detection voltages that are less than the initial zero point detection value are generated, the calculation circuit calculates a new zero point detection value that is greater than a smallest one of the plurality of detection voltages by a predetermined value and updates the initial zero point detection value with the new zero point detection value.

A further perspective of the present invention is a method for calculating an opened amount of a throttle valve. The method includes detecting the opened amount of the throttle valve to generate a detection voltage, storing an initial zero point detection value in a memory, and calculating the opened amount of the throttle valve from a difference between the detection voltage and the initial zero point detection value. The initial zero point detection value is the detection voltage when the throttle valve is fully closed. When a plurality of detection voltages that are less than the initial zero point detection value are generated, a new zero point detection value that is greater than a smallest one of the plurality of detection voltages by a predetermined value is calculated. The initial zero point detection value is updated with the new zero point detection value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
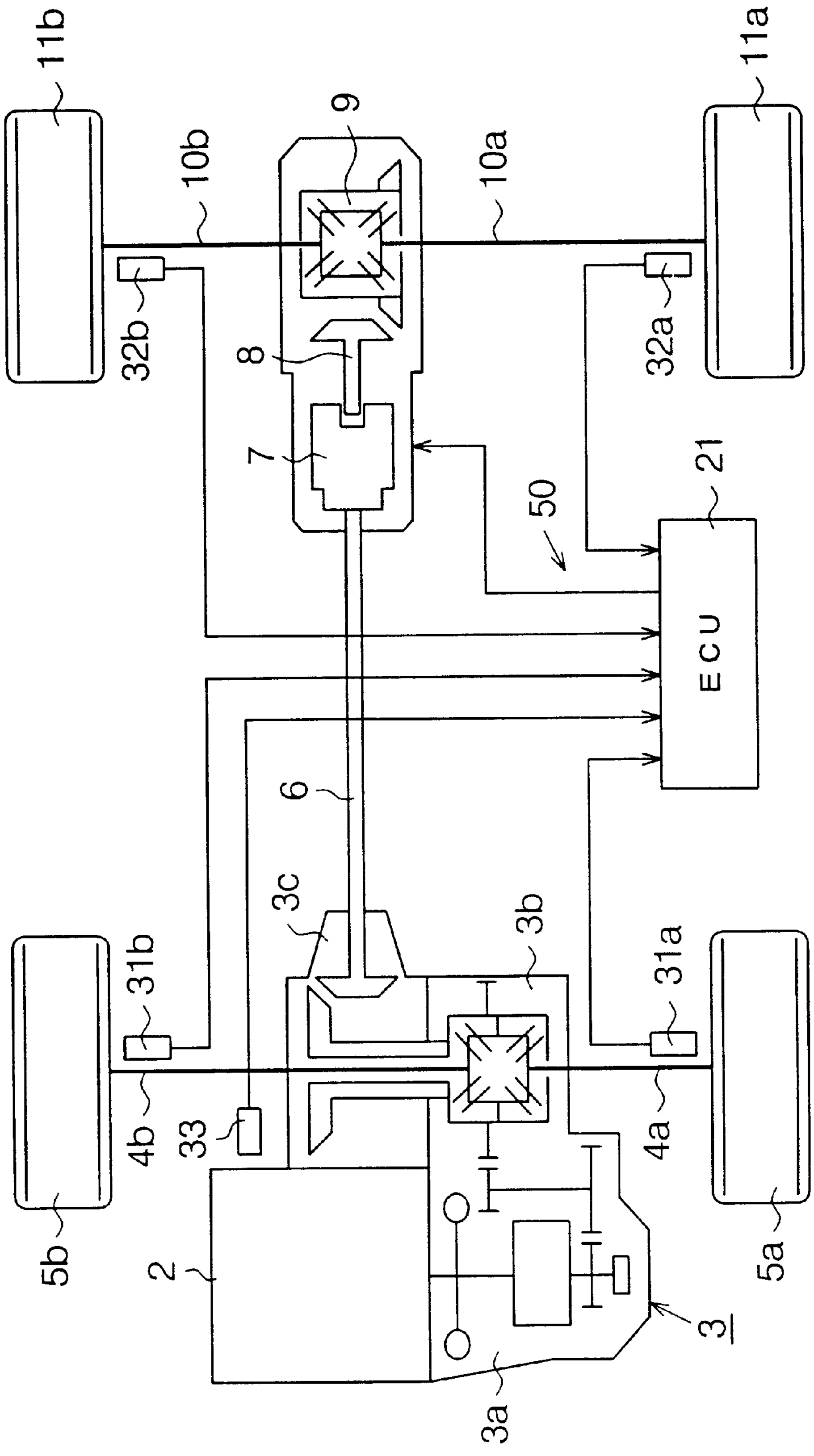
FIG. 1 is a schematic diagram of a four wheel drive vehicle that includes a throttle valve opened amount calculator according to a preferred embodiment of the present invention.

In the drawings, like numerals are used for like elements throughout.

A throttle valve opened amount calculator according to a preferred embodiment of the present invention is applied to a drive force transmission control circuit 50 of a four wheel drive vehicle 100. FIG. 1 is a schematic diagram of the four wheel drive vehicle 100 in which the drive force transmission control circuit 50 is incorporated.

As shown in FIG. 1, the four wheel drive vehicle 100 includes an internal combustion engine 2 and a transaxle 3. The transaxle 3 includes a transmission 3*a*, a front differential 3*b*, and a transfer 3*c*. A left front axle 4*a* and a right front axle 4*b* are connected to the transaxle 3. Front wheels 5*a*, 5*b* are mounted on the front axles 4*a*, 4*b*, respectively. The transaxle 3 transmits the drive force produced by the engine 2 to the front axles 4*a*, 4*b*. The front axles 4*a*, 4*b* further transmit the drive force to the front wheels 5*a*, 5*b*.

As shown in FIG. 1, the transfer 3*c* is connected to a propeller shaft 6, which is further connected to a drive force transmission 7. A drive pinion shaft 8 connects the drive force transmission 7 to a rear differential 9. The rear differential 9 is connected to left and right rear axles 10*a*, 10*b*. Rear wheels 11*a*, 11*b* are mounted on the rear axles 10*a*, 10*b*, respectively.

The drive force generated by the engine 2 is transmitted to the drive force transmission 7 by the transfer 3*c* and the propeller shaft 6. Further, the drive force is transmitted to the drive pinion shaft 8, the rear differential 9, and the rear axles 10*a*, 10*b* from the drive force transmission 7 to rotate the rear wheels 11*a*, 11*b*.

The drive force transmission 7 has a wet multiplate electromagnetic clutch mechanism. The electromagnetic clutch mechanism includes a plurality of separable clutch plates (not shown) and an electromagnetic coil. The electromagnetic force generated by the electromagnetic coil, which is incorporated in the drive force transmission 7, causes the clutch plates to frictionally engage each other. In this state, the drive force of the engine 2 that is transmitted to the drive force transmission 7 is transmitted from the propeller shaft 6 to the drive pinion shaft 8.

The drive force transmitted to the drive pinion shaft 8 increases as the frictional engaging force of the clutch plates increases. The frictional engaging force of the clutch plates is determined by the value of the current supplied to the electromagnetic coil 7*a*. The drive force transmission 7 controls the frictional engaging force to select either one of a four wheel drive state or a two wheel drive state and to control the drive force distribution rate between the front wheels 5*a*, 5*b* and the rear wheels 11*a*, 11*b* in the four wheel drive state.

Figure 2:
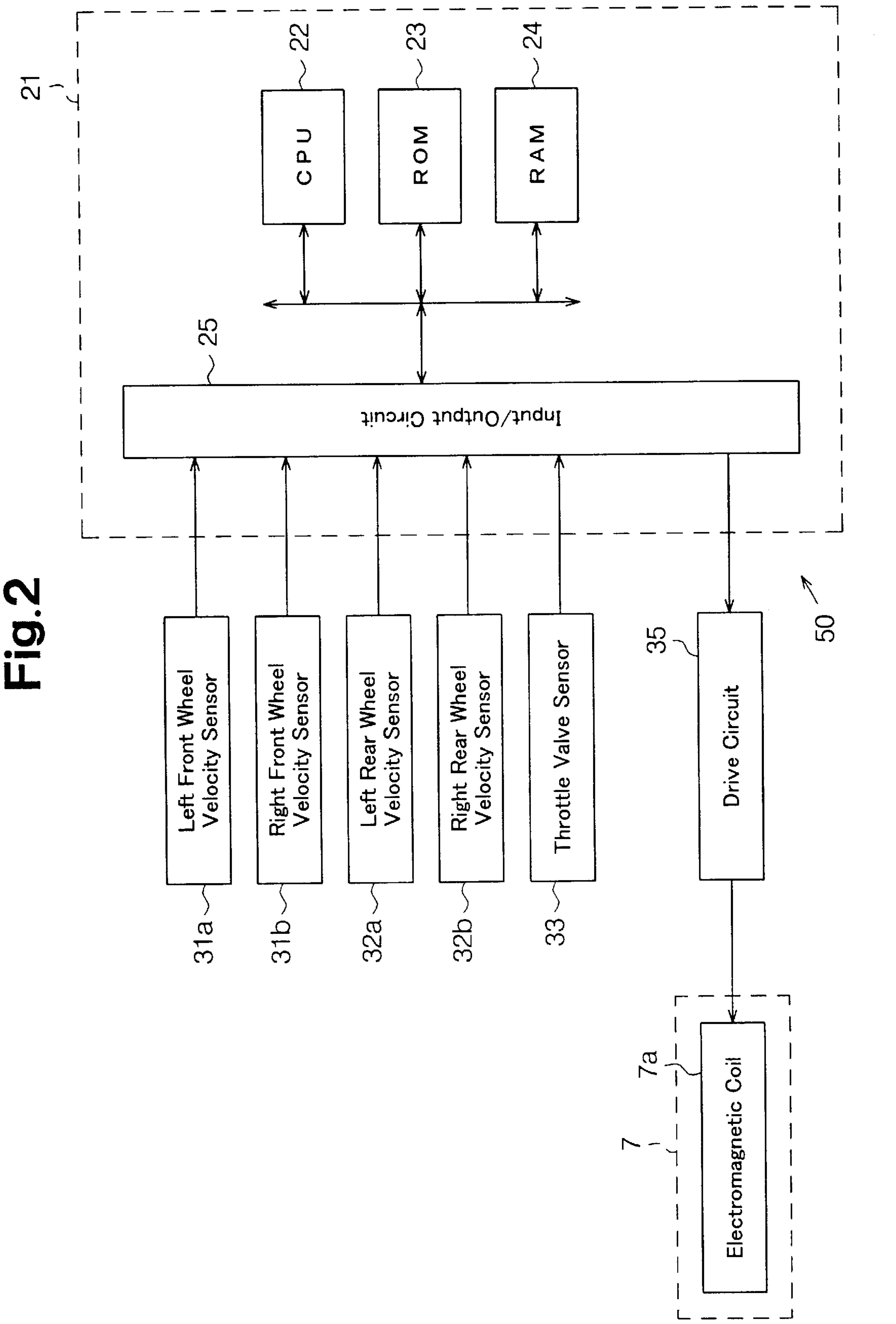
FIG. 2 is a block diagram illustrating the configuration of the throttle valve opened amount calculator of FIG. 1.

A drive force transmission control circuit (throttle valve opened amount calculator) 50, which controls the drive force transmission 7, will now be discussed with reference to FIG. 2. The drive force transmission control circuit 50 includes a drive force distribution controller (electronic control unit, ECU) 21 and a throttle valve sensor 33.

The drive force distribution controller 21 includes a CPU 22, which serves as a calculation circuit, a ROM 23, a RAM 24, and an input/output circuit 25.

The CPU 22 performs various calculations to control the electromagnetic coil 7*a* of the drive force transmission 7 in accordance with various types of programs stored in the ROM 23. The ROM 23 stores various programs, which control the electromagnetic coil 7*a*, various types of data, and various types of map data. In addition to storing various types of data, the RAM 23 temporarily stores calculation results of the CPU 22.

The control programs stored in the ROM 23 are used to calculate the value of the current supplied to the electromagnetic coil 7*a* in accordance with the present driven state of the automobile and to control the electromagnetic coil 7*a* by means of the input/output circuit 25 in accordance with the calculated current value.

The ROM 23 stores a program for calculating the opened amount θ of a throttle valve and a program for correcting a zero point detection value TPV0, which is used to calculate the opened amount θ. The map data stored in the ROM 23 is used to perform four wheel drive. The ROM 23 stores map data related to duty ratio control of the electromagnetic coil 7*a*. The map data related to the duty ratio is used to produce the frictional engaging force (target frictional engaging force) corresponding to the drive force distribution rate that is optimal under the present driving state.

A left front wheel velocity sensor 31*a*, a right front wheel velocity sensor 31*b*, a left rear wheel velocity sensor 32*a*, and a right rear wheel velocity sensor 32*b* are connected to the CPU 22 via input/output circuit 25.

The left front wheel velocity sensor 31*a* detects the wheel velocity of the left front wheel 5*a*. The right front wheel velocity sensor 31*b* detects the wheel velocity of the right front wheel 5*b*. The front wheel velocity sensors 31*a*, 31*b* generate detection signals corresponding to the present velocity of the left front wheel 5*a* and the right front wheel 5*b*, respectively, and send the detection signals to the input/output circuit 25. In the same manner, the left rear wheel velocity sensor 32*a* detects the wheel velocity of the left rear wheel 11*a*, and the right rear wheel velocity sensor 32*b* detects the wheel velocity of the right rear wheel 11*b*. The rear wheel velocity sensors 32*a*, 32*b* generate detection signals corresponding to the present velocity of the left rear wheel 11*a* and the right rear wheel 11*b*, respectively, and send the detection signals to the input/output circuit 25.

The CPU 22 calculates the present wheel velocities VFL, VFR, VRL, VRR of the wheels 5*a*, 5*b*, 11*a*, 11*b* from the detection signals of the wheel velocity sensors 31*a*, 31*b*, 32*a*, 32*b*, respectively. The CPU 22 calculates the front wheel average velocity VFN ((VFL+VFR)/2) from the wheel velocities VFL, VFR and calculates the rear wheel average velocity VRN ((VRL+VRR)/2) from the wheel velocities VRL, VRR.

The CPU 22 calculates a differential velocity ΔN(|VFN−VRN|/2) from the front wheel average velocity VFN and the rear wheel average velocity VRN. In the preferred embodiment, the CPU 22 obtains the vehicle velocity from the wheel velocities VFL, VFR, VRL, VRR.

A throttle valve sensor 33, which detects the opened amount θ of the throttle valve of the engine 2, is connected to the CPU 22 via the input/output circuit 25. In the preferred embodiment, the throttle valve sensor 33 is controlled by an engine controller (not shown). The throttle valve sensor 33 generates a detection signal (detection voltage) TPV corresponding to the throttle valve opened amount θ and provides the CPU 22 with the detection voltage TPV via the input/output circuit 25. The throttle valve opens and closes in accordance with the depression of an acceleration pedal (not shown). The CPU 22 uses the detection voltage TPV to calculate the throttle valve opened amount θ as described below.

The CPU 22 subtracts a predetermined reference value (zero point detection value TPV0) from the detection voltage TPV to obtain an absolute value TPA(TPV−TPV0). The zero point detection value TPV0 is updated periodically and stored in the RAM 24. The CPU 22 uses map data of the throttle valve opened amount θ corresponding to the absolute value TPA, which is stored in the ROM 23, to obtain the throttle valve opened amount θ corresponding to the present detection voltage (absolute value TPA).

The CPU 22 calculates the optimal drive force distribution rate using map data, which is stored in the ROM 23, in accordance with the throttle valve opened amount θ, the differential velocity ΔN, and the vehicle velocity. The CPU 22 generates a current generation signal, which determines the current value of the electromagnetic coil 7*a*, in accordance with the calculation result. More specifically, the CPU 22 generates a current generation signal to obtain the duty ratio resulting in a drive force distribution rate that is optimal for the present driven state of the automobile in accordance with the map data stored in the ROM 23.

The CPU 22 is connected to a drive circuit 35, which controls the electromagnetic force of the electromagnetic coil 7*a* incorporated in the drive force transmission 7, via the input/output circuit 25. The drive force 35 generates drive current having a predetermined value and supplies the electromagnetic coil 7*a* of the drive force transmission 7 with the generated current. Accordingly, the drive force transmission 7 properly controls the drive force distribution rate.

Figure 3:
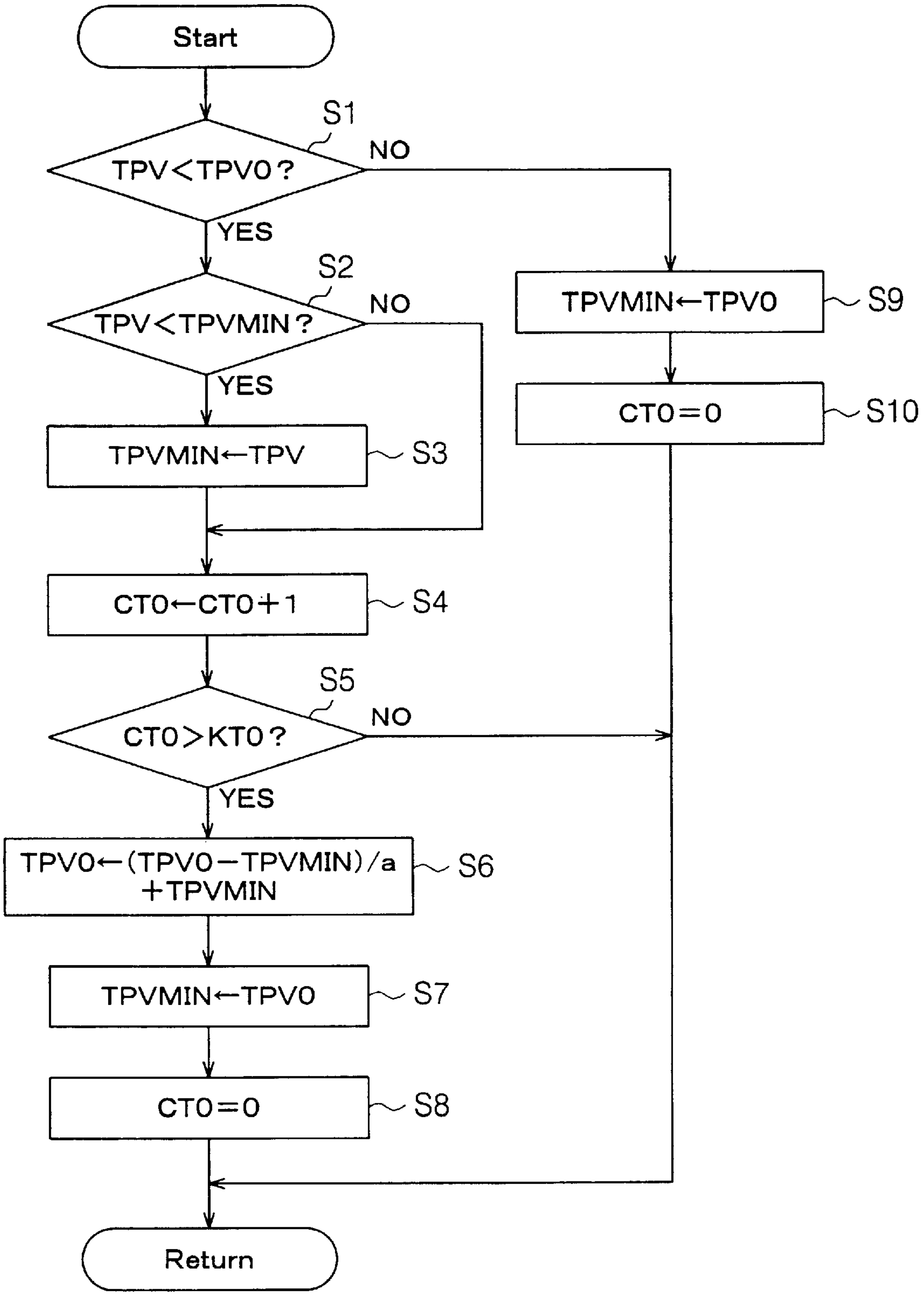
FIG. 3 is a flowchart illustrating a process executed by the throttle valve opened amount calculator to correct a zero point detection value voltage.

The correction of the zero point detection value TPV0, which is used to calculate the throttle valve opened amount θ for the drive force transmission control circuit (throttle valve opened amount calculator) 50 will now be discussed with reference to the flowchart of FIG. 3. The CPU 22 periodically performs the process illustrated in the flowchart of FIG. 3.

The CPU 22 retrieves the detection voltage TPV and compares the detection voltage TPV with the zero point detection value TPV0, which is stored in the RAM 24 (step S1). When the detection voltage TPV is less than the zero point detection value TPV0, the CPU 22 proceeds to step S2 and compares the detection voltage TPV with a minimum detection voltage value TPVMIN, which is stored in the RAM 24 (step S2).

When the detection voltage TPV is less than the minimum detection voltage value TPVMIN, the CPU 22 sets the detected detection voltage TPV as the new minimum detection voltage value TPVMIN and rewrites the minimum detection voltage value TPVMIN (step S3). Afterward, the CPU 22 proceeds to step S4. At step S2, if the detection voltage TPV is greater than the minimum detection voltage value TPVMIN, the CPU 22 proceeds to step S4 without rewriting the minimum detection voltage value TPVMIN. The minimum detection voltage value TPVMIN is set at the value of the zero point detection value TPV0 when the initial value is set.

In step S4, the CPU 22 adds "1" to a zero point detection counter value CT0, which is stored in the RAM 24, and than compares the zero point detection counter value CT0 with a reference detection number KT0 (step S5). The reference detection number KT0, which is stored in the ROM 23, is the number of times the detection voltage TPV is successively less than the zero point detection value TPV0. In the preferred embodiment, when the number of times in which the detection voltage TPV is less than the zero point detection value TPV0 reaches the reference detection number KT0 within a predetermined period, the zero point detection value TPV0 is corrected.

In step S5, when the zero point detection counter value CT0 is less than the reference detection number KT0, the CPU 22 temporarily terminates the process. Accordingly, when the detection voltage TPV being less than the zero point detection value TPV0 is successively detected for a number of times that is less than the reference detection value KT0 and the detection voltage TPV is less than the minimum detection voltage value TPV, the smallest detection voltage TPV is stored in the RAM 24 as the minimum detection voltage value TPVMIN (steps S2, S3).

When the zero point detection counter value CT0 reaches the reference detection number KT0, the CPU 22 performs a calculation to correct the zero point detection value (step S6). The correction calculation is performed based on formula (1) using the zero point detection value TPV0 and the minimum detection voltage value TPVMIN.

$$TPV0 \leftarrow (TPV0 - TPVMIN)/a + TPVMIN \quad (1)$$

In formula (1), "a" is a constant. In the preferred embodiment, "a" is set to, for example "2".

As apparent from formula (1), in the correction calculation of the zero point detection value, the difference between the zero point detection value TPV0 and the minimum detection voltage value TPVMIN is divided by two and the minimum detection voltage value TPVMIN is added to the divided difference.

The CPU 22 sets the calculation result as the new zero point detection value TPV0 and rewrites the former zero point detection value TPV0. The CPU 22 then uses the new zero point detection value TPV0 to calculate the throttle valve opened amount θ.

Subsequently, the CPU 22 sets the new zero point detection value TPV0 as the minimum detection voltage value TPVMIN (step S7) and resets the zero point detection counter value CT0 to "0" (step S8). Afterward, the CPU 22 temporarily terminates the correction process.

If the detection voltage TPV is greater than the zero point detection value TPV0 is step S1, the CPU 22 proceeds to step S9 and sets the zero point detection value TPV0, which is stored in the RAM 24, as the minimum detection voltage value TPVMIN. Then, the CPU 22 resets the zero point detection counter CT0 to "0" (step S10) and temporarily terminates the process. Thus, even if the detection voltage TPV becomes much smaller than the minimum detection voltage value TPVMIN momentarily due to, for example, noise, the minimum detection voltage value TPVMIN is replaced by the present zero point detection value TPV0 when the detection voltage TPV is detected as being greater than the zero point detection value TPV0 Accordingly, an erroneous minimum detection voltage value TPVMIN is not used to calculate the new zero point detection value TPV0.

The throttle valve opened amount calculator 50 has the advantages described below.

(1) When the detection voltage TPV being less than the zero point detection value TPV0 is detected for a predetermined number of times during a predetermined period, the zero point detection value TPV0 is replaced by the corrected, new zero point detection value TPV0. The new zero point detection value TPV0 is obtained by adding the minimum detection voltage value TPVMIN to a value that is one half of the difference between the zero point detection value TPV0 and the minimum detection voltage value TPVMIN. Thus, the throttle valve opened amount is calculated with high accuracy.

(2) When the detection voltage TPV is greater than the zero point detection value TPV0, the CPU 22 rewrites the zero point detection value TPV0, which is stored in the RAM 24, to the minimum detection voltage value TPVMIN. Accordingly, even if the detection voltage TPV becomes much smaller than the minimum detection voltage value TPVMIN momentarily due to, for example, noise, as long as the subsequently detected detection voltage TPV is greater than the zero point detection value TPV0, the detection voltage, which is abnormal due to noise, is set as the minimum detection voltage value TPVMIN and not used for subsequent calculation. Thus, even if the power supply voltage supplied to the sensor decreases for one reason or another or even if the detection voltage TPV becomes abnormally low due to noise, the throttle valve opened amount θ is calculated with high accuracy.

(3) When the detection voltage TPV being less than the zero point detection value TPV0 is successively detected for a number of times that is equal to the reference detection number KT0 within a predetermined period, the zero point detection value TPV0 (minimum detection voltage value TPVMIN) is corrected. Accordingly, even if the detection voltage TPV becomes lower than the zero point detection value TPV0 due to momentary voltage fluctuation or noise, the zero point detection value TPV0 is not corrected. As a result, the calculation of the throttle valve opened amount θ is hardly affected by voltage fluctuation or noise.

(4) If the detection voltage TPV is detected as being greater then the zero point detection value TPV0 after the zero point detection value TPV0 is corrected, the minimum detection voltage value TPVMIN is replaced by the corrected zero point detection value TPV0. Accordingly, when the detection voltage TPV is successively detected as being less than the zero point detection value TPV0 within the predetermined time, the minimum detection voltage value TPVMIN, which was obtained in the past, is not used in the correction process. As a result, the minimum detection voltage value TPVMIN is obtained with high accuracy.

It should be apparent to those skilled in the art that the present invention may be embodied in many other specific forms without departing from the spirit or scope of the invention. Particularly, it should be understood that the present invention may be embodied in the following forms.

The constant "a" may be a value that is "1" or greater.

The reference detection number KT0 may be a value in which the detection voltage TPV is only less than the zero point detection value TPV0 during the predetermined time.

In formula (1), instead of the smallest detection voltage TPV that is less than the zero point detection value TPV0 (minimum detection voltage value TPVMIN), the voltage value of the second smallest detection voltage TPV may be used to correct the zero point detection value TPV0.

In formula (1), the average value of a plurality of detection voltages TPV, which are smaller than the zero point detection value TPV0, may be calculated to update the zero point detection value TPV0 with the average value of the detection voltage TPV. The average value of the detection voltage TPV may be calculated without the smallest detection voltage TPV.

The present invention may be embodied in a front engine rear drive (FR) or rear engine rear drive (RR) based four wheel drive vehicle.

The present examples and embodiments are to be considered as illustrative and not restrictive, and the invention is not to be limited to the details given herein, but may be modified within the scope and equivalence of the appended claims.

What is claimed is:

1. A throttle valve opened amount calculator comprising:

a valve sensor for detecting an opened amount of a throttle valve to generate a detection voltage;

a memory connected to the valve sensor to store an initial zero point detection value, wherein the initial zero point detection value is the detection voltage output from the throttle valve sensor when the throttle valve is fully closed; and a calculation circuit connected to the valve sensor and the memory to obtain the difference between the detection voltage and the initial zero point detection value and to calculate the opened amount of the throttle valve with the difference, wherein, when a plurality of detection voltages that are less than the initial zero point detection value are generated, the calculation circuit calculates a new zero point detection value that is greater than a smallest one of the plurality of detection voltages by a predetermined value and updates the initial zero point detection value with the new zero point detection value.

2. The calculator according to claim 1, wherein the calculation circuit obtains a differential voltage between the smallest one of the plurality of detection voltages and the initial zero point detection value, divides the differential voltage by a predetermined value, and adds the divided differential voltage to the smallest one of the plurality of detection voltages to calculate the new zero point detection value.

3. The calculator according to claim 2, wherein the calculation circuit calculates the new zero point detection value when the plurality of detection voltages are detected within a predetermined period.

4. The calculator according to claim 1, wherein the calculation circuit obtains an average value of the plurality of detection voltages and sets the average value as the new zero point detection value.

5. The calculator according to claim 4, wherein the calculation circuit calculates the new zero point detection value when the plurality of detection voltages are detected within a predetermined period.

6. The calculator according to claim 1, wherein the calculation circuit uses detection voltages excluding the smallest one of the plurality of detection voltages to calculate the new zero point detection value.

7. The calculator according to claim 6, wherein the calculation circuit calculates the new zero point detection value when the plurality of detection voltages are detected within a predetermined period.

8. The calculator according to claim 6, wherein the calculation circuit obtains an average value of the detection voltages excluding the smallest one of the plurality of detection voltages and sets the average value as the new zero point detection value.

9. The calculator according to claim 8, wherein the calculation circuit calculates the new zero point detection value when the plurality of detection voltages are detected within a predetermined period.

10. The calculator according to claim 1, wherein the calculation circuit calculates the new zero point detection value when the plurality of detection voltages is successively detected.

11. The calculator according to claim 10, wherein the calculation circuit calculates the new zero point detection value when the plurality of detection voltages are detected within a predetermined period.

12. The calculator according to claim 1, wherein the calculation circuit calculates the new zero point detection value when a predetermined number of detection voltages that are smaller than the initial zero point detection value are successively detected.

13. The calculator according to claim 12, wherein the calculation circuit calculates the new zero point detection value when the predetermined number of detection voltages are detected within a predetermined period.

14. A method for calculating an opened amount of a throttle valve, the method comprising the steps of:

detecting the opened amount of the throttle valve to generate a detection voltage;

storing an initial zero point detection value in a memory, wherein the initial zero point detection value is the detection voltage when the throttle valve is fully closed; and calculating the opened amount of the throttle valve from a difference between the detection voltage and the initial zero point detection value, wherein the calculation step includes the steps of;

when a plurality of detection voltages that are less than the initial zero point detection value are generated, calculating a new zero point detection value that is greater than a smallest one of the plurality of detection voltages by a predetermined value; and updating the initial zero point detection value with the new zero point detection value.

15. The method according to claim 14, wherein the step for calculating the new zero point detection value includes the steps of:

obtaining a differential voltage between the smallest one of the plurality of detection voltages and the initial zero point detection value;

dividing the differential voltage with a predetermined value to calculate a divided differential voltage; and adding the divided differential voltage to the smallest one of the plurality of detection voltages to calculate the new zero point detection voltage.

16. The method according to claim 15, wherein the step for calculating the new zero point detection value includes calculating the new zero point detection value when the plurality of detection voltages are detected within a predetermined period.

17. The method according to claim 14, wherein the step for calculating the new zero point detection value includes the steps of:

obtaining an average value of the plurality of detection voltages; and setting the average value as the new zero point detection value.

18. The method according to claim 17, wherein the step for calculating the new zero point detection value includes calculating the new zero point detection value when the plurality of detection voltages are detected within a predetermined period.

19. The method according to claim 14, wherein the step for calculating the new zero point detection value includes the steps of:

using the detection voltages excluding the smallest one of the plurality of detection voltages to calculate the new zero point detection value.

20. The method according to claim 19, wherein the step for calculating the new zero point detection value includes calculating the new zero point detection value when the plurality of detection voltages are detected within a predetermined period.

21. The method according to claim 19, wherein the step for calculating the new zero point detection value includes:

obtaining an average value of the detection voltages excluding the smallest one of the plurality of detection voltages; and setting the average value as the new zero point detection value.

22. The method according to claim 21, wherein the step for calculating the new zero point detection value includes calculating the new zero point detection value when the plurality of detection voltages are detected within a predetermined period.

23. The method according to claim 14, wherein the step for calculating the new zero point detection value includes calculating the new zero point detection value when the plurality of detection voltages are successively detected.

24. The method according to claim 23, wherein the step for calculating the new zero point detection value includes calculating the new zero point detection value when the plurality of detection voltages are detected within a predetermined period.

25. The method according to claim 14, wherein the step for calculating the new zero point detection value includes calculating the new zero point detection value when a predetermined number of detection voltages that are smaller than the initial zero point detection value are successively detected.

26. The method according to claim 25, wherein the step for calculating the new zero point detection value includes calculating the new zero point detection value when the predetermined number of detection voltages are detected within a predetermined period.

* * * * *